US012542039B2

(12) United States Patent
Perez et al.

(10) Patent No.: US 12,542,039 B2
(45) Date of Patent: Feb. 3, 2026

(54) METHODS AND SYSTEMS FOR TRACKING AN ANTI-THEFT TAG BEYOND THE RETAIL SPACE

(71) Applicant: Sensormatic Electronics, LLC, Boca Raton, FL (US)

(72) Inventors: Sergio M. Perez, Lake Worth, FL (US); Adam Bergman, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 59 days.

(21) Appl. No.: 18/407,940

(22) Filed: Jan. 9, 2024

(65) Prior Publication Data

US 2024/0242582 A1 Jul. 18, 2024

Related U.S. Application Data (60) Provisional application No. 63/479,887, filed on Jan. 13, 2023.

(51) Int. Cl.
*G08B 13/24* (2006.01)
*H04W 4/021* (2018.01)
*H04W 4/029* (2018.01)
*H04W 4/80* (2018.01)
*H04W 84/04* (2009.01)

(52) U.S. Cl.
CPC ........ *G08B 13/2462* (2013.01); *H04W 4/021* (2013.01); *H04W 4/029* (2018.02); *H04W 4/80* (2018.02); *H04W 84/042* (2013.01)

(58) Field of Classification Search
CPC .................................................. G08B 13/2462
See application file for complete search history.

(56) References Cited

U.S. PATENT DOCUMENTS

| | | | |
|---|---|---|---|
| 2003/0008659 A1* | 1/2003 | Waters | H04W 4/029 455/456.1 |
| 2015/0243146 A1* | 8/2015 | Sayegh | G08B 13/1463 340/572.8 |
| 2020/0193785 A1* | 6/2020 | Berglund | H04W 4/35 |
| 2022/0084380 A1* | 3/2022 | Trivelpiece | G06K 19/0716 |
| 2022/0151361 A1* | 5/2022 | Hill | G06K 19/07758 |
| 2024/0331513 A1* | 10/2024 | Halliwell | G08B 13/2434 |

FOREIGN PATENT DOCUMENTS

WO 2013101495 A1 7/2013

OTHER PUBLICATIONS

International Search Report and Written Opinion for International Patent Application No. PCT/US2024/011376, mailed May 24, 2024 (14 pages).

* cited by examiner

*Primary Examiner* — Travis R Hunnings
(74) *Attorney, Agent, or Firm* — ArentFox Schiff LLP (57) ABSTRACT

Examples described herein generally relate to a system and method for tracking items. The system may detect an unauthorized removal of an item tagged with an active radio tag associated with an item identifier. The system may activate, in response to the unauthorized removal, tracking of the active radio tag, wherein after activation of the tracking, the active radio tag transmits the item identifier. The system may collect, at a database, the item identifier and location information indicating a location of the item when the item identifier was transmitted. The system may display the location information from the database for one or more items including the item.

13 Claims, 6 Drawing Sheets

METHODS AND SYSTEMS FOR TRACKING AN ANTI-THEFT TAG BEYOND THE RETAIL SPACE

CROSS-REFERENCE TO RELATED APPLICATIONS

This application claims priority to U.S. Provisional Application No. 63/479,887 titled "METHODS AND SYSTEMS FOR TRACKING AN ANTI-THEFT TAG BEYOND THE RETAIL SPACE," filed Jan. 13, 2023, which is assigned to the assignee hereof, and incorporated herein by reference in its entirety.

TECHNICAL FIELD

The present disclosure relates to electronic tags and, and more particularly to methods and systems for tracking an anti-theft tag beyond the retail space.

BACKGROUND

Retailers detect movement of goods using a security tag attached to the goods and sensors that detect the location of the security tag. A security system may include an exit system (e.g., a pedestal including a reader) that detects the presence of a tag.

While such security systems are useful in detecting a surreptitious theft of an item, they cannot track the item once the tag has left the range of the readers. For example, gang shoplifting incidents known as organized retail crime (ORC) may involve the theft of multiple items by multiple people at the same time. While a security system may detect that tagged items have been stolen, the scale of such events often results in some of the items being removed from the retail location. The security system may provide information about which items were stolen.

Thus, there is a need in the art for improvements in system for tracking security tags. In particular, there is a need for systems and methods for tracking an anti-theft tag beyond a retail space.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method including: detecting an unauthorized removal of an item tagged with an active radio tag associated with an item identifier; activating, in response to the unauthorized removal, tracking of the active radio tag, wherein after activation of the tracking, the active radio tag transmits the item identifier; collecting, at a database, the item identifier and location information indicating a location of the item when the item identifier was transmitted; and displaying the location information from the database for one or more items including the item.

In some aspects, the techniques described herein relate to a method, wherein detecting the unauthorized removal includes: detecting movement of the active radio tag at an exit system; and determining that the active radio tag has not been deactivated.

In some aspects, the techniques described herein relate to a method, wherein activating tracking of the active radio tag includes transmitting a request for the active radio tag to transmit the item identifier and the location information.

In some aspects, the techniques described herein relate to a method, wherein activating tracking of the tag includes adding the item identifier to a set of tracked items.

In some aspects, the techniques described herein relate to a method, wherein the active radio tag is configured to transmit the item identifier prior to the unauthorized removal and until deactivated at a point of sale.

In some aspects, the techniques described herein relate to a method, wherein the active radio tag is configured to transmit the item identifier to a mobile communications device via a short range wireless communications protocol.

In some aspects, the techniques described herein relate to a method, wherein the location information is a location of the mobile communications device provided from the mobile communications device to the database.

In some aspects, the techniques described herein relate to a method, wherein the active radio tag is configured to transmit the item identifier to the database via a radio access network.

In some aspects, the techniques described herein relate to a method, wherein displaying the tag location information from the database for one or more items including the item includes selecting the tag location information from the database based on one or more of: a value associated with the item identifier; a number of items with location information within a geographic area; or a user selected item.

In some aspects, the techniques described herein relate to a system including: an active radio tag associated with an item identifier and attached to a corresponding item; a point of sale system configured to deactivate the active radio tag in response to a purchase of the corresponding item; an exit system configured to detect the active radio tag within a coverage areas and detect an unauthorized removal of the corresponding item; and at least one computer device including a memory storing computer-executable instructions and a processor configured to execute the computer-executable instructions to: activate, in response to the unauthorized removal, tracking of the active radio tag, wherein after activation of the tracking, the active radio tag transmits the item identifier; collect, at a database, the item identifier and location information indicating a location of the item when the item identifier was transmitted; and display the location information from the database for one or more items including the item.

In some aspects, the techniques described herein relate to a non-transitory computer-readable medium storing computer-executable instructions, that when executed by one or more processors of a computing device, cause the computing device to: detect an unauthorized removal of an item tagged with an active radio tag associated with an item identifier; activate, in response to the unauthorized removal, tracking of the active radio tag, wherein after activation of the tracking, the active radio tag transmits the item identifier; collect, at a database, the item identifier and location information indicating a location of the item when the item identifier was transmitted; and display the location information from the database for one or more items including the item Additional advantages and novel features relating to implementations of the present disclosure will be set forth in

DETAILED DESCRIPTION

The present disclosure provides systems and methods for tracking an anti-theft tag beyond a retail environment. The disclosure provides for configuration of active radio tags and a system for activating or deactivating such tags to track items that have left a retail location.

Electronic Article Surveillance (EAS) systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with a security tag (such as an RFID and/or an acousto-magnetic (AM) tag), also known as an EAS marker, that, when active, generates a response signal when passed through this interrogation zone. An antenna and receiver in the same or another "pedestal" detects this response signal and generates an alarm.

In the case of organized retail crime (ORC), an alarm may be insufficient to stop theft of an item. For example, a thief may evade security personnel or law enforcement officers. Further, confronting a thief at the retail location may escalate the situation and possibly put customers at risk.

In an aspect, the present disclosure provides a security system and methods for tracking tagged items beyond a retail location. Items may be tagged with an active radio tag that is configured to transmit an item identifier and/or location of the item. For example, the active radio tag may utilize short range wireless communications to transmit the item identifier to a mobile communications device, which can forward the information to a database, or the active radio tag may transmit the item identifier to the database via a radio access network. The database may collect item identifiers and location information. The system may display a location of the tracked item, for example, to security personnel or law enforcement officers.

Figure 1:
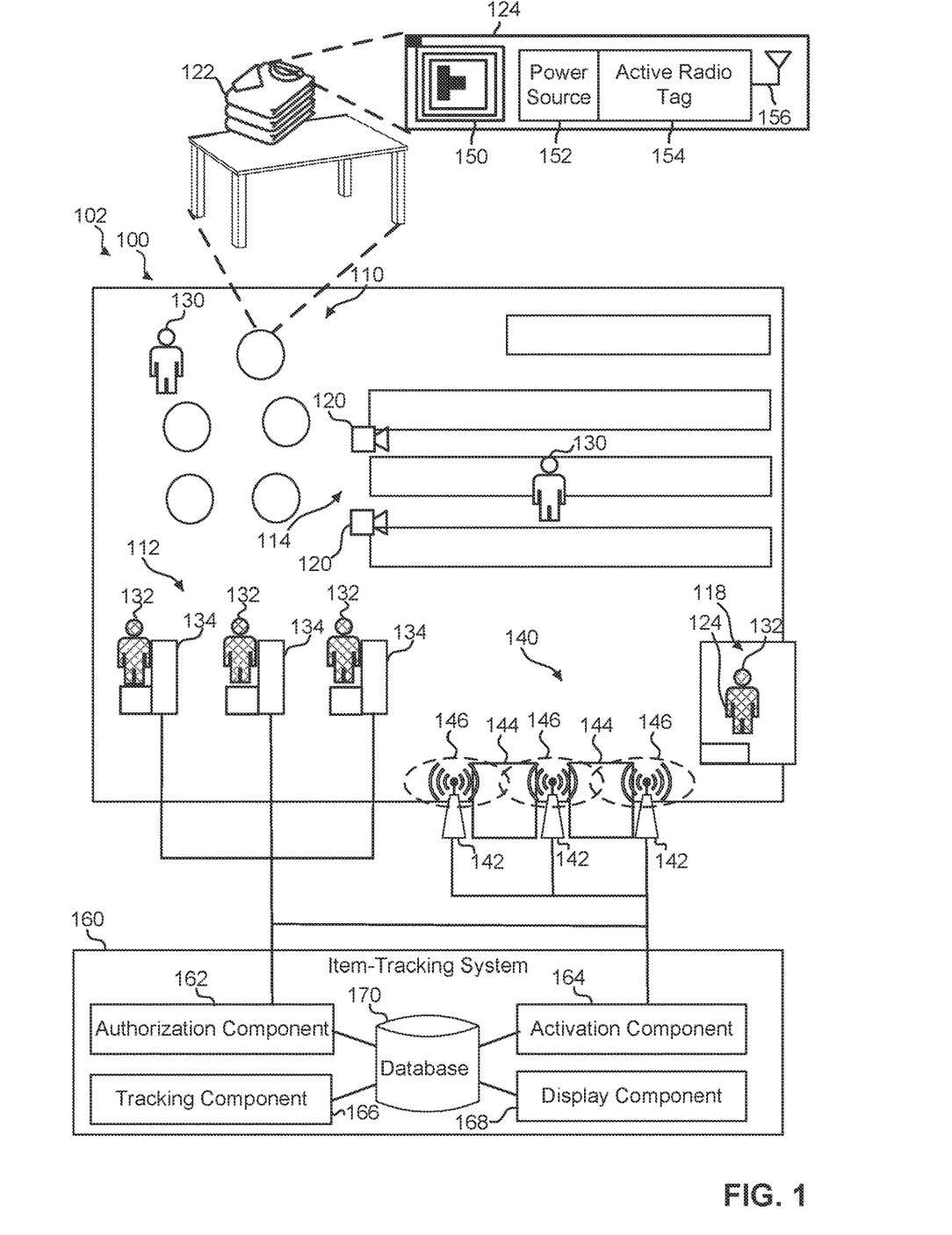
FIG. 1 is a schematic diagram of an example retail location including a first example of a security system.

Referring now to FIG. 1, an example retail location 100 includes multiple regions where tagged products may be located. For example, the retail location 100 may include an open display area 110, a front end 112, aisles 114, and a security room 118. Customers 130 may be located within the different regions. Workers 132 may be stationed at locations such as check out registers and the security room 118. The workers 132 may operate a point of sale (POS) system 134. In some implementations, the POS system 134 may include self-service kiosks or a mobile application. A person of skill in the art would understand that the disclosed systems and methods are applicable to a variety of retail locations and the present disclosure is not limited to the example retail location or areas.

As discussed above, retailers (e.g., consumer products and apparel retailers) have deployed security tags such as radio frequency identification (RFID) systems in stores to track product movements as they arrive at stores, are placed on display on the sales floor, and are sold. By adopting RFID, retailers are able to reduce the amount of time that the store employees spend counting the inventory (e.g., manually counting inventory that is on the floor and in stock room), as well as increase merchandise visibility within each store, thereby enabling shoppers in the store and online to find what they seek. RFID uses radio waves to read and capture information stored on a tag attached to an object such as a good, product, or merchandise. Additionally, RFID tags may be used with a security system to detect inventory changes and possible loss events. For example, RFID tags may be read by an exit system 140 to determine whether a tagged item 122 is leaving the retail location.

In an aspect, a tag (e.g., tag 124) can include an active radio tag 154. The active radio tag 154 may be configured to transmit an item identifier and/or location of the active radio tag 154. The item identifier may be a unique code such as a serial number that identifier the active radio tag 154. The item identifier may be associated with an item, for example, when the item is tagged. In some implementations, the item 122 may be tagged with the tag 124 during manufacture or packaging in a process known as source labeling or source tagging. Accordingly, the item identifier and/or tag 124 may be used to track the item throughout a distribution chain. For example, the active radio tag may be configured to transmit the item identifier prior to any unauthorized removal and until deactivated at a point of sale.

The active radio tag 154 is configured to transmit at least the item identifier via one or more radio technologies. In some implementations, the active radio tag 154 utilizes a short range wireless communications protocol such as BLUETOOTH, ZIGBEE, FLASHLINQ, WIMEDIA, or WI-FI based on the IEEE 802.11 standard. For instance, the active radio tag 154 may transmit the item identifier to one or more nearby mobile communications devices or may connect to a wireless local area network (WLAN). In some implementations, the active radio tag 154 utilizes a radio access network (RAN) or cellular network using, for example, long term evolution (LTE) or new radio (NR) radio technology. For instance, the active radio tag 154 may connect to a RAN to transmit the item identifier and/or tag location to a database.

The active radio tag 154 may include a power source 152 and an antenna 156. For example, the power source 152 may be a battery. In some implementations, the power source 152 may be charged via energy harvesting from an environment (e.g., solar or RF energy harvesting). In some implementations, the active radio tag 154 may include an RFID tag 150 (e.g., an electronic article surveillance (EAS) tag). The RFID tag 150 may be read from up to several feet away by a reader and does not need to be within direct line-of-sight of the reader to be tracked.

An RFID system may be made up of two parts: a tag or label (e.g., RFID tag 150) and a reader (e.g., exit system 140). RFID tags 150 (which may also be referred to as EPC tags or labels) are embedded with an RFID transmitter and a receiver. The RFID component on the tags may include a microchip that stores and processes information, and an antenna to receive and transmit signals. The EPC tag may further contain the specific serial number for each specific object (e.g., an electronic product code (EPC)). The EPC may also be embedded in the active radio tag 154. For example, in one implementation, the tag 124 may include multiple memory banks such as a reserved memory, EPC memory, tag identification (TID) memory, and user memory. The reserved memory bank may include an access password and a kill password. The EPC memory may include the EPC, a protocol control, and a cyclic redundancy check value. The TID memory may include a tag identification. The user memory may store custom data.

The POS system 134 may be configured to deactivate a tag 124 upon purchase of the tagged item 122. In some implementations, the POS system 134 may deactivate the tag 124 itself, for example, using the kill password to prevent the tag 124 from transmitting. In some implementations, the POS system 134 may deactivate the tag 124 within the security system 102, for example, by setting a status of the tag 124 to deactivated.

To read the information encoded on the tag 124, a two-way radio transmitter-receiver called an interrogator or reader (e.g., exit system 140) emits a signal to the EPC tag using the antenna (e.g., internal antennas). The exit system 140 may apply filtering to indicate what memory bank the EPC tag 124 should use to respond to the emitted signal. The EPC tag 124 may respond with the information (e.g., EPC value or serial number) written in the memory bank. The EPC tag data set may include any information stored on the EPC tag 124 as well as information about reading the EPC tag 124. For example, the EPC tag data set may include: a timestamp, a location, a signal transmission power, a received signal strength indication (RSSI), and an identifier of the RFID reader (e.g., exit system 140). For purposes of this disclosure, the terms, the EPC tag and RFID tag may be used interchangeably. The EPC tag 124 may be a passive tag or a battery powered EPC tag. A passive RFID tag may use the radio wave energy of the RFID interrogator or receiver to relay the stored information back to the interrogator. In contrast, a battery powered EPC tag 124 may be embedded with a small battery that powers the relay of information.

The security system 102 may include an exit system 140 and an item-tracking system 160. The exit system 140 may include multiple sensors 142 located near exits 144. For example, the example retail location 100 may include two exits 144 that are relatively narrow. The sensors 142 may be located on each side of the exits 144. For example, in an implementation, the sensors 142 may include at least one RFID reader including an antenna that generates a tag detection field 146. Generally, the sensors 142 may be configured (e.g., by setting a power level) such that the tag detection fields 146 cover the exits 144 to detect tags moving through the exits. Although the sensors 142 are illustrated as pedestals adjacent the exits 144, sensors 142 may be located on the floor and/or the ceiling. The sensors 142 may include additional sensors that may produce measurements other than RF measurements. For example, the sensors 142 may include infrared (IR) sensors, inertial sensors, magnetic sensors, or cameras.

The item-tracking system 160 may be a computer device programmed to manage tag data based on signals received from the tags 124, the POS system 134, and the exit system 140. The item-tracking system 160 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device. In some implementations, the item-tracking system 160 may be located separately from the retail location 100. For example, the item-tracking system 160 or component thereof may be hosted on a server or datacenter of a cloud network and communicate with components of the security system 102 at the retail location 100.

The item-tracking system 160 includes an authorization component 162 configured to deactivate a tag 124 upon purchase of the tagged item 122. In some implementations, the authorization component 162 may be configured to detect an unauthorized removal of an item tagged with an active radio tag associated with an item identifier. For instance, the authorization component 162 may receive a signal from the exit system 140 indicating movement of the tag 124 at an exit system. The authorization component 162 may detect unauthorized removal of the item 122 when the active radio tag 154 is not deactivated and movement of the active radio tag 154 is detected. The item-tracking system 160 may include an activation component 164 configured to activate, in response to the unauthorized removal, tracking of the active radio tag. After activation of the tracking, the active radio tag 154 transmits the item identifier. The item-tracking system 160 may include a tracking component 166 configured to collect, at a database, the item identifier and location information indicating a location of the item when the item identifier was transmitted. The item-tracking system 160 may include a display component 168 configured to display the location information from the database for one or more items including the item. For example, the display component may be an application that presents a graphical user interface on a computer display such as a monitor.

Figure 2:
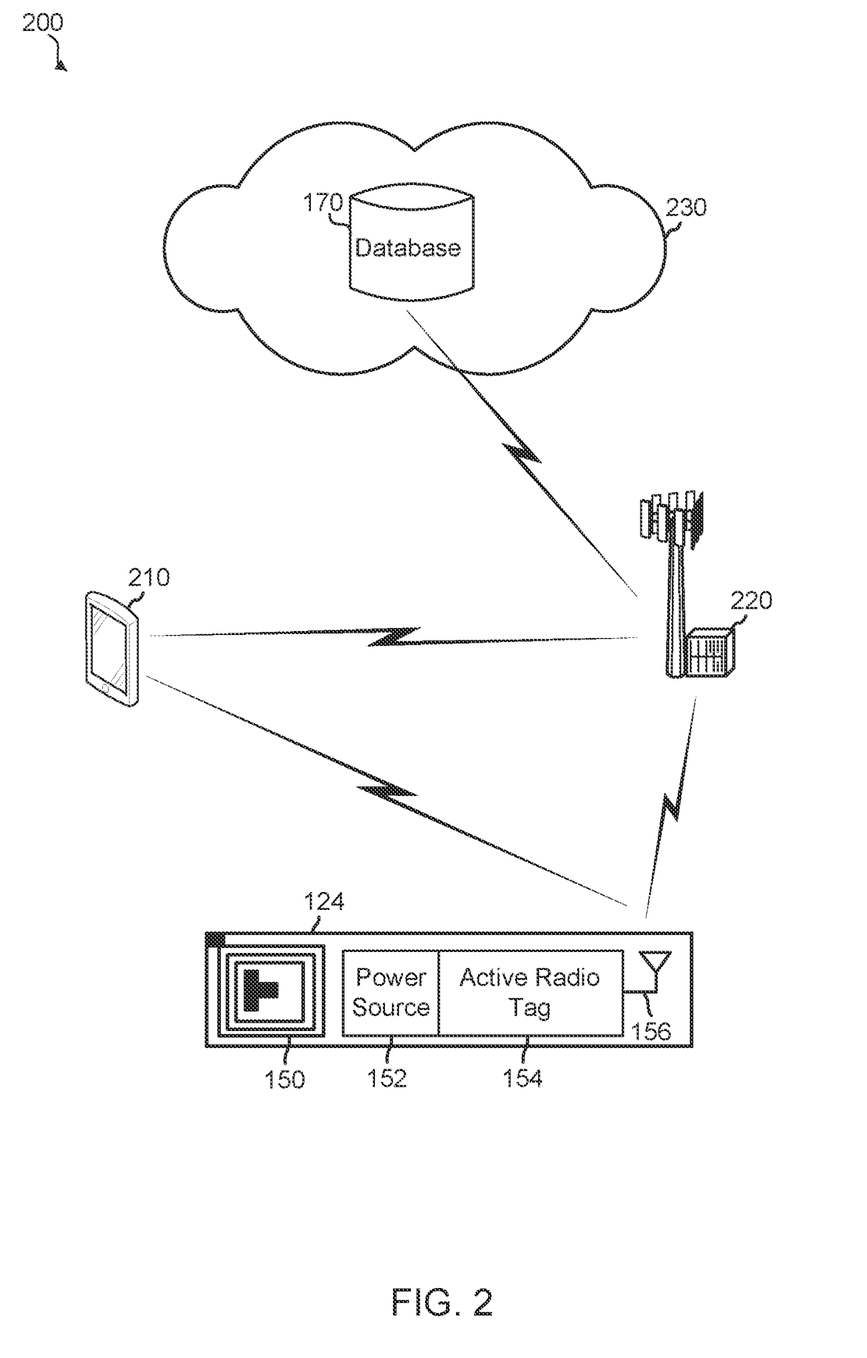
FIG. 2 is a schematic diagram of example communications for transmitting an item identifier.

Turning to FIG. 2, the active radio tag 154 may transmit at least an identifier of the tag 124 in an environment 200 outside of the retail location 100. In some implementations, the tag 124 and/or active radio tag 154 may include a global positioning system (GPS) receiver configured to determine a location of the tag 124. The active radio tag 154 may transmit the location of the tag 124.

In some implementations, the active radio tag 154 may transmit the item identifier and/or tag location to a mobile communications device 210 via a short range communication protocol. For example, the mobile communications device 210 may be a mobile phone, tablet, personal computer, laptop computer, etc. In some implementations, for example, the mobile communications device 210 may be configured to receive the item identifier and/or tag location from any tag 124. For example, the mobile communications device 210 may participate in a Find My Device system. The mobile communications device 210 may receive a message (e.g., via BLUETOOTH) and forward the item identifier and/or tag location to the database 170 via a radio access network 220. In some implementations, the mobile communications device 210 may add a location of the mobile device to the item identifier received from the active radio tag 154. For example, the mobile communications device 210 may detect the location based on a global navigational satellite system (GNSS) such as the global positioning system (GPS) or based on local wireless networks.

In some implementations, the active radio tag 154 may transmit the item identifier and/or tag location to the database 170 via a radio access network 220. For example, the active radio tag 154 may connect to the radio access network 220 via a base station. The active radio tag 154 may transmit an internet protocol (IP) packet including the item identifier and/or tag location to the database 170. In such implementations, the active radio tag 154 may detect the location based on a GNSS such as GPS or based on local wireless networks and/or access points of the radio access network 220.

Figure 3:
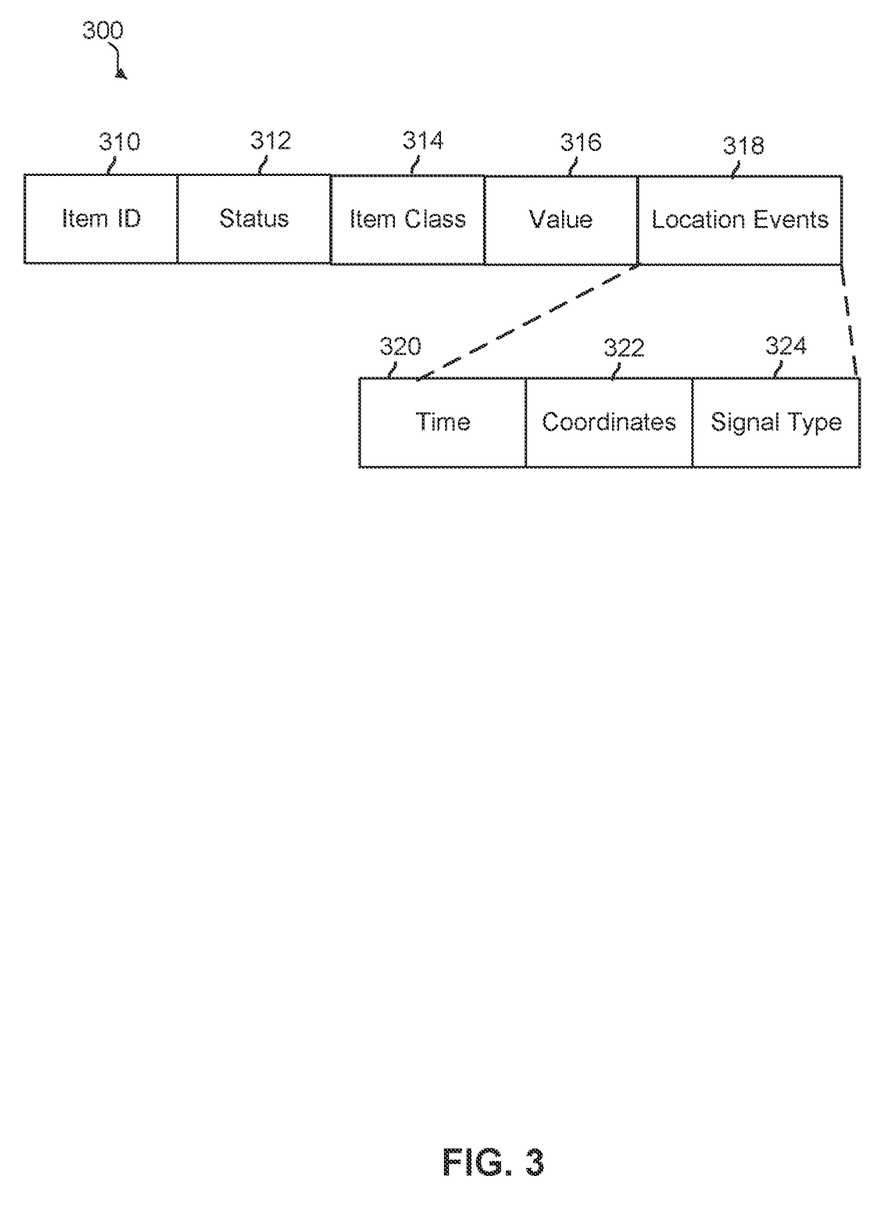
FIG. 3 is a diagram of an example database of item information.

FIG. 3 illustrates an example configuration 300 of the database 170. The configuration 300 may define a schema for storing tag information for tracking items. For example, the configuration 300 may include an item identifier 310, a status 312, an item class 314, a value 316, and location events 318. In some implementations, the location events 318 may be a separate structure such as a table that stores a time 320, coordinates 322, and signal type 324. The item identifier 310 may be the unique code stored in the tag 124 (e.g., an EPC code). The status 312 may indicate whether tracking is activated or deactivated for the tag 124. The item class 314 may provide information about the item associated with the tag such as a product stock keeping unit (SKU), manufacturer, legal owner, etc. The value 316 may indicate a value of the item such as a monetary value or a value category (e.g., high, medium, low). Each location event 318 may correspond to a transmission from the active radio tag 154. The time 320 may indicate a time that the active radio tag 154 transmitted the item identifier 310. The coordinates 322 may indicate the location of the active radio tag 154 at the time of the transmission. In some implementations, the coordinates 322 may correspond to the location of the mobile communications device 210 that received the item identifier 310 via a short range wireless communication protocol. The signal type 324 may indicates how the item identifier 310 was received (e.g., via mobile communications device 210 or radio access network 220).

Figure 4:
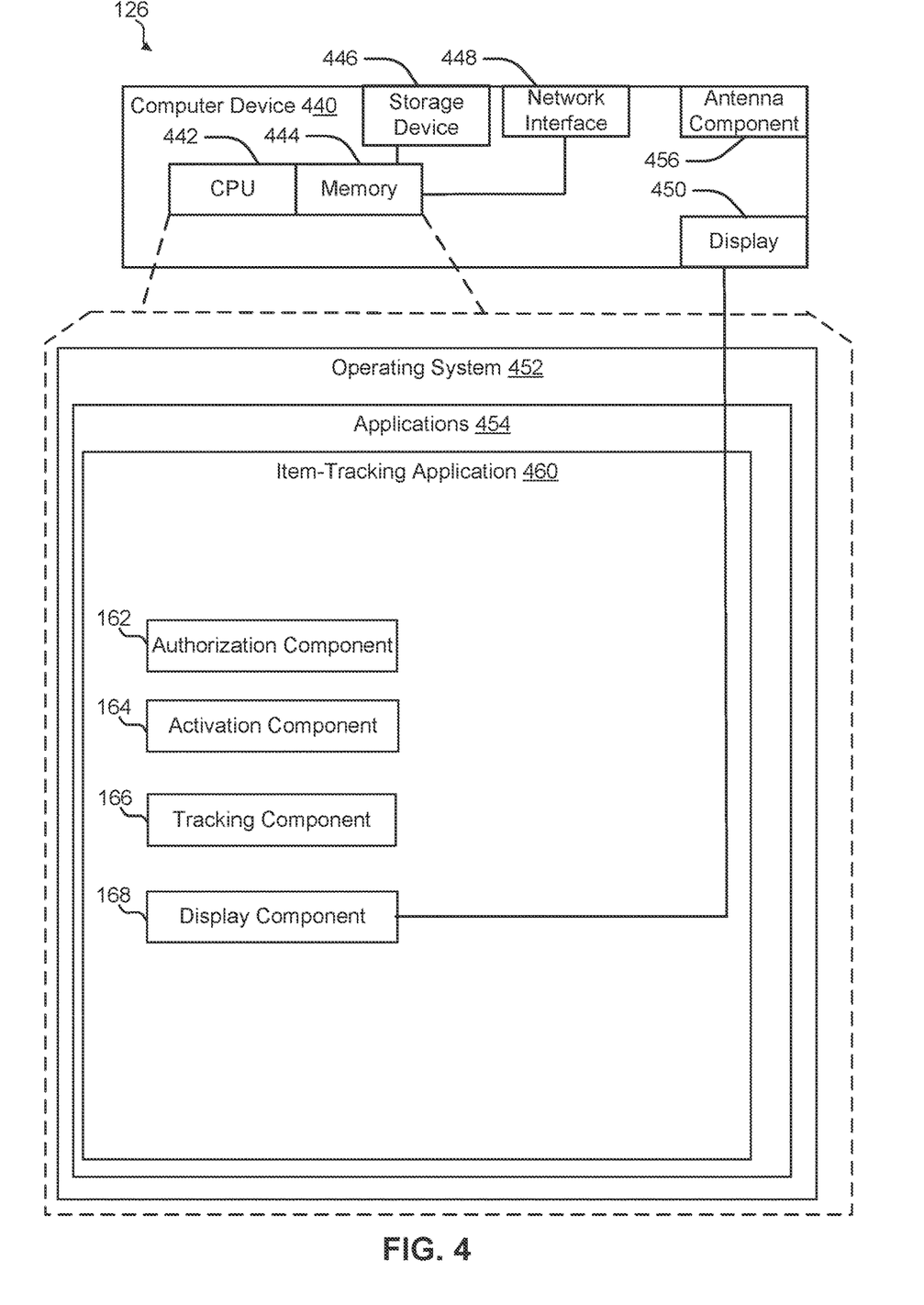
FIG. 4 is a diagram of an example computer system implementing a security system including an item tracking application, in accordance with an implementation of the present disclosure.

Turning to FIG. 4, an example item-tracking system 160 may be implemented as a computer device 440 configured to execute an item-tracking application 460. Whether the computer device 440 is located at the retail location 100 or remotely, the computer device 440 may include a central processing unit (CPU) 442 including one or more processors that, individually or in combination, execute instructions stored in memory 444. For example, the CPU 442 may execute an operating system 452 and one or more applications 454, which may include the item-tracking application 460. The computer device 440 may include a storage device 446 for storing data (e.g., POS system events and exit system measurements). The computer device 440 may also include a network interface 448 for communication with external devices via a network. For example, the computer device 440 may communicate with the POS system 134 and/or the exit system 140.

The computer device 440 may optionally include a display 450. The display 450 may be, for example, a computer monitor and/or a touch-screen. The display 450 may provide information to an operator and allow the operator to configure the computer device 440.

Memory 444 may be configured for storing data and/or computer-executable instructions defining and/or associated with an operating system 452 and/or application 454, and CPU 442 may execute operating system 452 and/or application 454. Memory 444 may represent one or more hardware memory devices accessible to computer device 440. An example of memory 444 can include, but is not limited to, a type of memory usable by a computer, such as random access memory (RAM), read only memory (ROM), tapes, magnetic discs, optical discs, volatile memory, non-volatile memory, and any combination thereof. Memory 444 may store local versions of applications being executed by CPU 442. In an implementation, the memory 444 may include a storage device, which may be a non-volatile memory.

The CPU 442 may include one or more processors for executing instructions. An example of CPU 442 can include, but is not limited to, any processor specially programmed as described herein, including a controller, microcontroller, application specific integrated circuit (ASIC), field programmable gate array (FPGA), system on chip (SoC), or other programmable logic or state machine. The CPU 442 may include other processing components such as an arithmetic logic unit (ALU), registers, and a control unit. The CPU 442 may include multiple cores and may be able to process different sets of instructions and/or data concurrently using the multiple cores to execute multiple threads.

The operating system 452 may include instructions (such as applications 454) stored in memory 444 and executable by the CPU 442. The applications 454 may include the item-tracking application 460 configured to track items that have been removed from the retail location 100 without authorization.

The item-tracking application 460 may include the authorization component 162, the activation component 164, the tracking component 166, and the display component 168.

Figure 5:
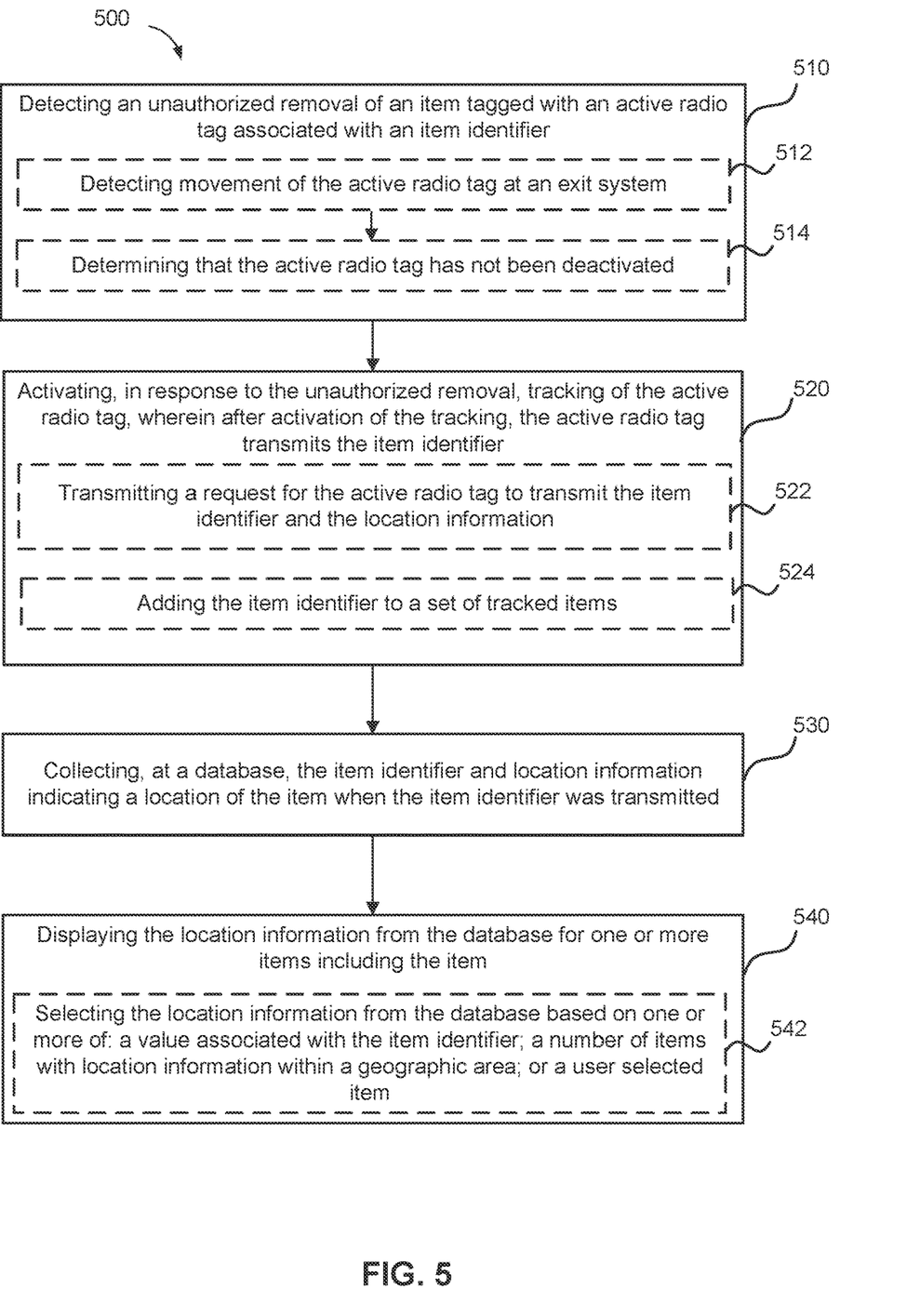
FIG. 5 is a flowchart of an example method of tracking items, in accordance with an implementation of the present disclosure.

Turning to FIG. 5, an example method 500 tracks items that have been removed from the retail location 100 without authorization. For example, method 500 may be performed by the item-tracking system 160 and/or the item-tracking application 460 on the computer device 440. Optional blocks are shown with dashed lines.

At block 510, the method 500 includes detecting an unauthorized removal of an item tagged with an active radio tag associated with an item identifier. For example, the item-tracking system 160 and/or the authorization component 162 may detect an unauthorized removal of an item 122 tagged with an active radio tag 154 associated with an item identifier 310. In some implementations, the block 510 may optionally include, at sub-block 512, detecting movement of the active radio tag 154 at an exit system; and, at sub-block 514, determining that the active radio tag 154 has not been deactivated.

At block 520, the method 500 includes activating, in response to the unauthorized removal, tracking of the active radio tag. After activation of the tracking, the active radio tag 154 transmits the item identifier 310. For example, the item-tracking system 160 and/or the activation component 164 may activate, in response to the unauthorized removal, tracking of the active radio tag 154. In some implementations, at sub-block 522, the block 520 may optionally include transmitting a request for the active radio tag 154 to transmit the item identifier and the location information. In some implementations, at sub-block 524, the block 520 may optionally include adding the item identifier 310 to a set of tracked items (e.g., in database 170).

At block 530, the method 500 includes collecting, at a database, the item identifier and location information indicating a location of the item when the item identifier was transmitted. For example, the item-tracking system 160 and/or the tracking component 166 may collect, at the database 170, the item identifier 310 and location information (e.g., location events 318) indicating a location of the item when the item identifier was transmitted. In some implementations, the active radio tag 154 is configured to transmit the item identifier to a mobile communications device 210 via a short range wireless communications protocol. The item-tracking system 160 and/or the tracking component 166 may receive the item identifier from the mobile communications device 210. The location information may be a location of the mobile communications device 210 provided from the mobile communications device to the database. In some implementations, the active radio tag 154 is configured to transmit the item identifier to the database via a radio access network 220.

At block 540, the method 500 includes displaying the location information from the database for one or more items including the item. For example, the item-tracking system 160 and/or the display component 168 may display the location information (e.g., location events 318) from the database 170 for one or more items including the item 122 on the display 450. In some implementations, at sub-block 542, the block 540 may optionally include selecting the tag location information from the database based on one or more of: a value 316 associated with the item identifier; a number of items with location information within a geographic area; or a user selected item.

Figure 6:
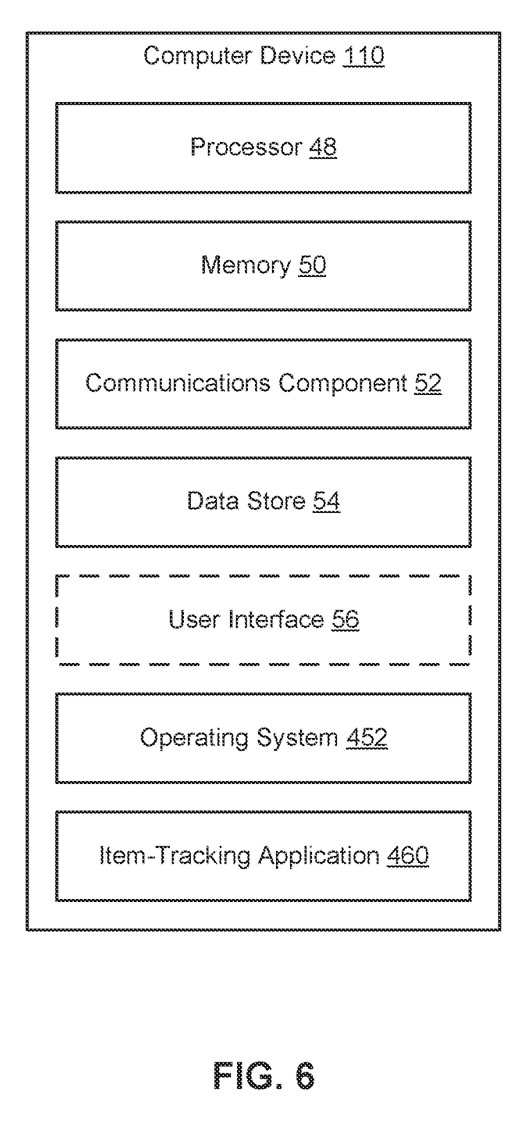
FIG. 6 is a schematic block diagram of an example computer device, in accordance with an implementation of the present disclosure.

Referring now to FIG. 6, illustrated is an example computer device 440 in accordance with an implementation, including additional component details as compared to FIG. 4. In one example, computer device 440 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 442.

In an example, computer device 440 may include memory 50 for storing instructions executable by the processor 48 for carrying out the functions described herein. In an implementation, for example, memory 50 may include memory 444. The memory 50 may include instructions for executing the item-tracking application 460.

Further, computer device 440 may include a communications component 52 that provides for establishing and maintaining communications with one or more parties utilizing hardware, software, and services as described herein. Communications component 52 may carry communications between components on computer device 440, as well as between computer device 440 and external devices, such as devices located across a communications network and/or devices serially or locally connected to computer device 440. For example, communications component 52 may include one or more buses, and may further include transmit chain components and receive chain components associated with a transmitter and receiver, respectively, operable for interfacing with external devices.

Additionally, computer device 440 may include a data store 54, which can be any suitable combination of hardware and/or software, that provides for mass storage of information, databases, and programs employed in connection with implementations described herein. For example, data store 54 may be a data repository for operating system 452 and/or applications 454. The data store may include memory 444 and/or storage device 446.

Computer device 440 may also include a user interface component 56 operable to receive inputs from a user of computer device 440 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 452 and/or applications 454. In addition, processor 48 may execute operating system 452 and/or applications 454, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Additional example implementations are described in the following numbered clauses:

Clause 1. A method comprising: detecting an unauthorized removal of an item tagged with an active radio tag associated with an item identifier; activating, in response to the unauthorized removal, tracking of the active radio tag, wherein after activation of the tracking, the active radio tag transmits the item identifier; collecting, at a database, the item identifier and location information indicating a location of the item when the item identifier was transmitted; and displaying the location information from the database for one or more items including the item.

Clause 2. The method of clause 1, wherein detecting the unauthorized removal comprises: detecting movement of the active radio tag at an exit system; and determining that the active radio tag has not been deactivated.

Clause 3. The method of clause 1 or 2, wherein activating tracking of the active radio tag comprises transmitting a request for the active radio tag to transmit the item identifier and the location information.

Clause 4. The method of any of clauses 1-3, wherein activating tracking of the tag comprises adding the item identifier to a set of tracked items.

Clause 5. The method of any of clauses 1-4, wherein the active radio tag is configured to transmit the item identifier prior to the unauthorized removal and until deactivated at a point of sale.

Clause 6. The method of any of clauses 1-5, wherein the active radio tag is configured to transmit the item identifier to a mobile communications device via a short range wireless communications protocol.

Clause 7. The method of clause 6, wherein the location information is a location of the mobile communications device provided from the mobile communications device to the database.

Clause 8. The method of any of clauses 1-7 wherein the active radio tag is configured to transmit the item identifier to the database via a radio access network.

Clause 9. The method of any of clauses 1-8, wherein displaying the tag location information from the database for one or more items including the item comprises selecting the tag location information from the database based on one or more of: a value associated with the item identifier; a number of items with location information within a geographic area; or a user selected item.

Clause 10. A system comprising: an active radio tag associated with an item identifier and attached to a corresponding item; a point of sale system configured to deactivate the active radio tag in response to a purchase of the corresponding item; an exit system configured to detect the active radio tag within a coverage areas and detect an unauthorized removal of the corresponding item; and at least one computer device including a memory storing computer-executable instructions and a processor configured to execute the computer-executable instructions to: activate, in response to the unauthorized removal, tracking of the active radio tag, wherein after activation of the tracking, the active radio tag transmits the item identifier; collect, at a database, the item identifier and location information indicating a location of the item when the item identifier was transmitted; and display the location information from the database for one or more items including the item.

Clause 11. The system of clause 10, wherein to detect the unauthorized removal, the at least one computer device is configured to: detect movement of the active radio tag at an exit system; and determine that the active radio tag has not been deactivated.

Clause 12. The system of clause 10 or 11, wherein to activate tracking of the active radio tag, the at least one computer device is configured to transmit a request for the active radio tag to transmit the item identifier and the location information.

Clause 13. The system of any of clauses 10-12, wherein to activate tracking of the active radio tag, the at least one computer device is configured to add the item identifier to a set of tracked items.

Clause 14. The system of any of clauses 10-13, wherein the active radio tag is configured to transmit the item identifier prior to the unauthorized removal and until deactivated at a point of sale.

Clause 15. The system of any of clauses 10-14, wherein the active radio tag is configured to transmit the item identifier to a mobile communications device via a short range wireless communications protocol.

Clause 16. The system of clause 15, wherein the location information is a location of the mobile communications device provided from the mobile communications device to the database.

Clause 17. The system of any of clauses 10-16, wherein the active radio tag is configured to transmit the item identifier to the database via a radio access network.

Clause 18. The system of any of clauses 10-17, wherein to display the tag location information from the database for one or more items including the item, the at least one computing device is configured to select the tag location information from the database based on one or more of: a value associated with the item identifier; a number of items with location information within a geographic area; or a user selected item.

Clause 19. A non-transitory computer-readable medium storing computer-executable instructions, that when executed by one or more processors of a computing device, cause the computing device to: detect an unauthorized removal of an item tagged with an active radio tag associated with an item identifier; activate, in response to the unauthorized removal, tracking of the active radio tag, wherein after activation of the tracking, the active radio tag transmits the item identifier; collect, at a database, the item identifier and location information indicating a location of the item when the item identifier was transmitted; and display the location information from the database for one or more items including the item.

Clause 20. The non-transitory computer-readable medium of clause 19, further comprising instructions to perform the method of any of clauses 2-9.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes computer storage media. Non-transitory computer-readable media excludes transitory signals. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method comprising:
   detecting an unauthorized removal of an item tagged with an active radio tag associated with an item identifier;
   activating, in response to the unauthorized removal, tracking of the active radio tag, wherein after activation of the tracking, the active radio tag transmits the item identifier, wherein activating tracking of the active radio tag comprises:
      transmitting a request for the active radio tag to transmit the item identifier and location information indicating a location of the item; and
      adding the item identifier to a set of tracked items in response to the unauthorized removal;
   collecting, at a database, the item identifier and the location information indicating the location of the item when the item identifier was transmitted; and
   displaying the location information from the database for one or more items including the item, wherein displaying the location information from the database for one or more items including the item comprises selecting the location information from the database based on one or more of: a value associated with the item identifier or a number of items with location information within a geographic area.

2. The method of claim 1, wherein detecting the unauthorized removal comprises:
   detecting movement of the active radio tag at an exit system; and
   determining that the active radio tag has not been deactivated.

3. The method of claim 1, wherein the active radio tag is configured to transmit the item identifier prior to the unauthorized removal and until deactivated at a point of sale.

4. The method of claim 1, wherein the active radio tag is configured to transmit the item identifier to a mobile communications device via a short range wireless communications protocol.

5. The method of claim 4, wherein the location information is a location of the mobile communications device provided from the mobile communications device to the database.

6. The method of claim 1, wherein the active radio tag is configured to transmit the item identifier to the database via a radio access network.

7. A system comprising:
   an active radio tag associated with an item identifier and attached to a corresponding item;
   a point of sale system configured to deactivate the active radio tag in response to a purchase of the corresponding item;
   an exit system configured to detect the active radio tag within a coverage areas and detect an unauthorized removal of the corresponding item; and
   at least one computer device including a memory storing computer-executable instructions and one or more processors, individually or in combination, configured to execute the computer-executable instructions to:
      activate, in response to the unauthorized removal, tracking of the active radio tag, wherein after activation of the tracking, the active radio tag transmits the item identifier, wherein to activate tracking of the active radio tag, the at least one computer device is configured to:
         transmit a request for the active radio tag to transmit the item identifier and location information indicating a location of the item; and
         add the item identifier to a set of tracked items in response to the unauthorized removal;
      collect, at a database, the item identifier and the location information indicating the location of the item when the item identifier was transmitted; and
      display the location information from the database for one or more items including the item, wherein to display the location information from the database for one or more items including the item, the at least one computer device is configured to select the location information from the database based on one or more of: a value associated with the item identifier or a number of items with location information within a geographic area.

8. The system of claim 7, wherein to detect the unauthorized removal, the at least one computer device is configured to:
   detect movement of the active radio tag at the exit system; and
   determine that the active radio tag has not been deactivated.

9. The system of claim 7, wherein the active radio tag is configured to transmit the item identifier prior to the unauthorized removal and until deactivated at a point of sale.

10. The system of claim 7, wherein the active radio tag is configured to transmit the item identifier to a mobile communications device via a short range wireless communications protocol.

11. The system of claim 10, wherein the location information is a location of the mobile communications device provided from the mobile communications device to the database.

12. The system of claim 7, wherein the active radio tag is configured to transmit the item identifier to the database via a radio access network.

13. A non-transitory computer-readable medium storing computer-executable instructions, that when executed by one or more processors of a computer device, cause the computer device to:

detect an unauthorized removal of an item tagged with an active radio tag associated with an item identifier;

activate, in response to the unauthorized removal, tracking of the active radio tag, wherein after activation of the tracking, the active radio tag transmits the item identifier, wherein the instructions to activate tracking of the active radio tag comprise instructions to:
    transmit a request for the active radio tag to transmit the item identifier and location information indicating a location of the item; and
    add the item identifier to a set of tracked items in response to the unauthorized removal;
  collect, at a database, the item identifier and the location information indicating the location of the item when the item identifier was transmitted; and
  display the location information from the database for one or more items including the item, wherein the instructions to display the location information comprise instructions to select the location information from the database based on one or more of: a value associated with the item identifier or a number of items with location information within a geographic area.

\* \* \* \* \*